US00RE44110E

(19) United States
(12) Reissued Patent
Venigalla

(10) Patent Number: US RE44,110 E
(45) Date of Reissued Patent: Mar. 26, 2013

(54) MACHINE-TO-MACHINE E-COMMERCE INTERFACE USING EXTENSIBLE MARKUP LANGUAGE

(75) Inventor: Srinivas Venigalla, Rochester, NY (US)

(73) Assignee: Mahogan Data LLC, Las Vegas, NV (US)

(21) Appl. No.: 11/489,751

(22) Filed: Jul. 19, 2006

Related U.S. Patent Documents

Reissue of:
(64) Patent No.: 6,766,361
Issued: Jul. 20, 2004
Appl. No.: 09/664,163
Filed: Sep. 18, 2000

U.S. Applications:
(60) Provisional application No. 60/184,778, filed on Feb. 24, 2000.

(51) Int. Cl.
*G06F 15/16* (2006.01)
*G06Q 30/00* (2006.01)

(52) U.S. Cl. ..... 709/217; 705/26; 705/80; 709/219; 709/200

(58) Field of Classification Search ..... 705/26, 705/80; 709/220, 237, 217, 219, 200
See application file for complete search history.

(56) References Cited

U.S. PATENT DOCUMENTS

| | | | | |
|---|---|---|---|---|
| 4,799,156 | A | | 1/1989 | Shavit et al. |
| 4,887,208 | A | | 12/1989 | Schneider et al. |
| 4,972,318 | A | | 11/1990 | Brown et al. |
| 4,984,155 | A | | 1/1991 | Geier et al. |
| 4,992,940 | A | | 2/1991 | Dworkin |
| 5,235,680 | A | | 8/1993 | Bijnagte |
| 5,345,586 | A | | 9/1994 | Hamala et al. |
| 5,351,186 | A | | 9/1994 | Bullock et al. |
| 5,596,745 | A | | 1/1997 | Lai et al. |
| 5,646,992 | A | | 7/1997 | Subler et al. |
| 5,694,546 | A | | 12/1997 | Reisman |
| 5,696,965 | A | * | 12/1997 | Dedrick ..... 709/203 |
| 5,710,887 | A | | 1/1998 | Chelliah et al. |
| 5,717,923 | A | | 2/1998 | Dedrick |
| 5,734,907 | A | | 3/1998 | Jarossay et al. |
| 5,819,092 | A | | 10/1998 | Ferguson et al. |
| 5,872,850 | A | * | 2/1999 | Klein et al. ..... 705/51 |
| 5,897,622 | A | * | 4/1999 | Blinn et al. ..... 705/26 |
| 5,940,807 | A | | 8/1999 | Purcell |

(Continued)

FOREIGN PATENT DOCUMENTS

| | | |
|---|---|---|
| WO | 99/46701 | 9/1999 |
| WO | 99/46707 | 9/1999 |

(Continued)

OTHER PUBLICATIONS

Alan Kotok, Nov. 9, 2006, www.xml.xom/pub/au/34.

(Continued)

*Primary Examiner* — Kenny Lin

(57) ABSTRACT

The present invention is a method and apparatus for the automated exchange of information, and more particularly the use of a hierarchical protocol based upon an extensible markup language (XML) in order to enable machine-to-machine communication of data related to the availability of goods, services and information. The machine-to-machine communication protocol and system having a predefined destination (universal resource locator (URL)) for bootstrapping the communication process, and a structured content protocol using XML. The system is preferably closed-ended, and employs a rule-based syntax with conditional data interaction. In a preferred embodiment, the system includes GUI-based design and programming tools that enable the set up of host and/or visitor machines in accordance with the protocol.

6 Claims, 7 Drawing Sheets

U.S. PATENT DOCUMENTS

| | | | | |
|---|---|---|---|---|
| 5,953,526 | A | 9/1999 | Day et al. | |
| 5,983,267 | A | 11/1999 | Shklar et al. | |
| 6,012,098 | A | 1/2000 | Bayeh et al. | |
| 6,028,605 | A | 2/2000 | Conrad et al. | |
| 6,154,738 | A * | 11/2000 | Call | 707/4 |
| 6,178,419 | B1 | 1/2001 | Legh-Smith et al. | |
| 6,199,079 | B1 | 3/2001 | Gupta et al. | |
| 6,253,198 | B1 | 6/2001 | Perkins | |
| 6,295,513 | B1 | 9/2001 | Thackston | |
| 6,339,795 | B1 | 1/2002 | Narurkar et al. | |
| 6,404,445 | B1 | 6/2002 | Galea et al. | |
| 6,480,853 | B1 * | 11/2002 | Jain | 707/10 |
| 6,574,655 | B1 | 6/2003 | Libert et al. | |
| 6,587,838 | B1 | 7/2003 | Esposito et al. | |
| 6,643,624 | B2 * | 11/2003 | Philippe et al. | 705/26 |
| 6,882,981 | B2 | 4/2005 | Philippe et al. | |
| 7,594,167 | B1 * | 9/2009 | Fuchs et al. | 715/234 |
| 2002/0004783 | A1 | 1/2002 | Paltenghe et al. | |
| 2002/0038292 | A1 | 3/2002 | Quelene | |
| 2004/0078273 | A1 * | 4/2004 | Loeb et al. | 705/26 |
| 2005/0210022 | A1 | 9/2005 | Philippe et al. | |

FOREIGN PATENT DOCUMENTS

| | | |
|---|---|---|
| WO | 99/57649 | 11/1999 |

OTHER PUBLICATIONS

Junglee Corporation, Home Page; www.archive.org/web/19970405093726/http://www.junglee.com; Apr. 5, 1997.

Virtual Database Technology, XML, and the Evolution of the Web—XML White Paper, by Anand Rajaraman; Jun. 1998.

The Junglee Technology Overview; www.archive.org/web/19970405093726/http://www.junglee.com/overview.html; Apr. 5, 1997.

Junglee News and Events Reference List; www.archive.org/web/19970405093726/http://www2.junglee.com/news/prarchive; Apr. 5, 1997.

Junglee Technology Demonstration; http://web.archive.org/web/1997050701909/www.junglee.com/demo.html; Apr. 5, 1997.

[Aug. 4, 1998] AMAZON.COM Acquires Two Leading Internet Companies, Innovators PlanetAll and Junglee to Enrich Customers' E-Commerce Experience.

Junglee Tries to Tame the Data Jungle, Mark Walter, Aug. 5, 1998, The Seybold Report on Internet Publishing, vol. 1, No. 12, http://www.xml.com/pub/a/SeyboldReport/ip011201.html.

"RosettaNET PIP Milestone," The Cover Pages, http://xml.coverpages.org/rosettaNet19990412.html, Apr. 12, 1999, 3 pages.

"Covisint," http://ecommerce.hostip.info/pages/267/Covisint.html, 3 pages, no date.

"Ford and Oracle to create multi-billion-dollar business-to-business Internet venture," Ford Motor Company, http://media.ford.com/newsroom/release_display.cfm?release=3203, Nov. 2, 1999, 3 pages.

"GM TradeXchange Launches Ahead of Schedule; GM and Commerce One Accomplish Auto Industry's First-Ever Internet-Based Auction," Business Wire, http://www.allbusiness.com/technology/software-services-applications-electronic/6776417-1.html, Dec. 20 1999, 4 pages.

"RosettaNet Implementation Framework Specification Version 1.1"; Nov. 8, 1999; pp. 1-68; RosettaNet.

Official Action in U.S. Appl. No. 11/513,996 issued Mar. 25, 2010, 5 pages.

Official Action in U.S. Appl. No. 11/513,996 issued Aug. 23, 2010, 4 pages.

S Simeonov; WDDX: Distributed Data for the Web; News & Articles on website, Dec. 7, 1998; pp. 1-10; web page at www.wddx.org/DistributedDataforWeb.htm.

E. Gamma, et al.; Design Patterns Elements of Reusable Object-Oriented Software; 1995, pp. 315-323; Addison-Wesley, Reading, Mass.

A. Feurerstein; "AOL, Yahoo enter b-to-b arena," Upside Today The Tech Insider; Mar. 20, 2000; pp. 1-4; www.upside.com/Story/38d697600_yahoo.html.

cXML FAQ, Nov. 9, 2006, www.cxml.org/prnews/faq.cfm.

XML Specifications, Proposals and Vocabularies, Sep. 5, 2000, http://wdvl.com/Authoring/Languages/XML/Specifications.html.

How XML Enables Internet Trading Communities and Marketplaces, Dec. 1999, Dr. Robert J. Glushko, www.infoloom.com/gcaconfs/WEB/philadelphia99/glushko.HTM.

ebXML, Jun. 2000, Robert Sutor, www.infoloom.com/gcaconfs,WEB.paris2000/S04-01.HTM.

Less is More in E-Business: The XML/edi Group, Nov. 10, 1999, David Webber & Alan Kotok, www.xml.xom/pub/a/1999/11/edi/index.html.

Electronic Data Interchange (EDI) XML, www.service-architecture.com/xml/articles/electronic_data_interchange_edi_xml.html, copyright 2005.

* cited by examiner

LEVEL 4

MACHINE-TO-MACHINE E-COMMERCE INTERFACE USING EXTENSIBLE MARKUP LANGUAGE

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,766,361. U.S. application Ser. No. 11/513,996 was filed on Aug. 31, 2006, as a continuation of the present application, U.S. application Ser. No. 11/489,751, filed Jul. 19, 2006.*

This application claims benefit of 60/184,778 filed Feb. 24, 2000.

This invention relates generally to the automated exchange of information between a web server and a plurality of visitor servers to facilitate the promotion of goods and services, and more particularly to the use of a hierarchical protocol based upon extensible markup language (XML) in order to enable concurrent scaleable bi-directional interaction between machine visitors and a host organization, including machine-to-machine communication of data related to the availability of goods, services and information.

BACKGROUND AND SUMMARY OF THE INVENTION

The present invention is a machine-to-machine communication protocol and system having a predefined destination (universal resource locator (URL)) for bootstrapping the communication process, a structured content protocol using XML. The system is also closed-ended, using a rule-based syntax with conditional data interaction. In a preferred embodiment, the system includes GUI-based design and programming tools enabling the set up of host and/or visitor machines in accordance with the protocol.

Heretofore, a number of patents and publications have disclosed applications for extensible markup language systems, the relevant portions of which may be briefly summarized as follows:

U.S. Pat. No. 6,012,098 to Baych et al., issued Jan. 4, 2000, teaches the use of servlets to isolate the retrieval of data from the rendering of data into a presentation format.

"The XML Handbook," by C. Goldfarb & P. Prescod, (ISBN 0-13-081152-1), Prentice-Hall, 1998, hereby incorporated by reference in its entirety, teaches the use of extensible markup language (XML) in electronic commerce (e-commerce), particularly in various applications for user-interaction with e-commerce systems.

An overwhelming portion of current Internet content is provided for a human recipient of the content and is designed for the human cognitive system. The Internet content is structured hierarchically and rendered using artifacts such as URLs, images, buttons, etc., so that the human recipient's mind can tackle the vast amount of information selectively. Most e-commerce sites spend significant of resources on making their Internet site user-friendly and presentation rich.

While this seems to be the most effective strategy to serve the consumer in general, the explosive growth of the Internet (including volume and choice) make it impossible for the average human to come to the terms with the situation. In other words, if a person needs to search for a piece of information on the Internet, particularly purchase information, his/her predicament is approximately the same as rummaging through the paper-based Library of Congress. So it is reasonable to believe that consumers will turn to computer based solutions to help them search, filter and organize the Internet data expediently. Early examples of this are the search engine and cataloging of content available through Yahoo® or NorthernLights.com®

In ordinary circumstances, it is not a technical challenge to build automated data mining solutions directed at the Internet content. However, the format and presentation of Web content currently found on the Internet is not suitable for access by machines (other computers) at all. The widely diverse styles and structure of Internet content, partially as a result of the lack of structure in the hypertext markup language (HTML), make it extremely hard for data mining solutions to take root on a widely applicable basis. The universal resource locator (URL; a mnemonic representation of an IP address), menu, image, or button based interface meant for humans becomes a huge bottleneck for any automatic connect/query/report strategy of search and data mining engines.

Accordingly, organizations need to implement a machine accessible interface to their web sites (or at least to web-accessible information), so that other computers and software-based systems and content providers can access their systems intelligently. Software systems work best when they exchange structured information using unambiguous interfaces. Hence, the present invention is a system that allows web sites to provide a universal content exchange interface, using XML as the format of data, so that machine-to-machine exchange can be used to communicate information and thereby further electronic commerce.

One object of the present invention is to establish a protocol whereby every company wishing to provide information relating to its products and/or services will utilize a common upper-level domain name identifier (e.g. xml.yourcompany-.com) that will serve as a machine-to-machine gateway.

Another object of the present invention is to provide a software module and associated protocol; XML based Machine Access Schema (XMAS) that enables any company to install the machine-to-machine interface with minimal programming effort. In one embodiment, such an interface would enable the exchange of non-secure product/service information only. In other words, it would not require the use of secure channels such as SSL or digital certification.

A further object of the present invention is to enable various extensions of basic machine-to-machine communications, including initiation of information exchange, perhaps followed by a secure data exchange between two or more trading "partners."

In accordance with the present invention, there is provided a method for machine-to-machine communication to facilitate electronic commerce, comprising the steps of: receiving an access schema inquiry from a visitor machine; and in response to the request from the visitor machine, sending from a host machine to the visitor machine, an access schema description for at least an upper level of said schema, wherein the access schema description advertises services offered by the host.

In accordance with another aspect of the present invention, there is provided a system for facilitating electronic commerce, including: a computer-based, host machine having access to data pertaining to vendor offerings; a computer-based visitor machine for establishing a dialog with the host machine; and a network interconnecting the host and visitor computer-based machines to enable for the exchange of data therebetween; wherein the visitor machine initiates a dialog with the host machine to determine a service discovery protocol therefor.

One aspect of the invention is based on the discovery of techniques for using an extensible markup language as a structural component for machine-to-machine communication. The techniques eliminate or reduce the need for manual preparation of predefined hierarchies of data, database structure, etc. Such techniques can be implemented, for example, by defining and using XML elements and a hierarchical data transfer protocol, whereby a host machine can communicate it as a data structure to a visitor machine and then reply to further inquiries for additional data from the visitor machine. The techniques can be implemented with any machine that can support existing Internet communication protocols, including HTTP, Java Messaging Services or CORBA.

The techniques described herein are advantageous because it is both an efficient and simple solution to the problem of widely varying content and lack of structure typically found in current Internet-based e-commerce systems. In addition, it facilitates the exchange of non-secure product/service information. The techniques of the invention are advantageous because they provide a protocol that incorporates unlimited alternatives as to the structure of content, yet permits efficient searching and transfer of product/service information using machines. Some of the techniques can be used to provide comparative product and service information in a comprehensive format for user review. As a result of the invention, the accuracy of locating appropriate goods or services will be tremendously improved. Since the WebServers publicize their services in an unambiguous and structured manner, Internet Portal companies can easily set up a true product-listing database comparable to a Yellow Pages index.

XML is currently used in Business-to-Business environments, where the participants involved in the information exchange are pre-qualified in a trusted framework. The trust is enforced through several means—submission of credit card information, establishing a legal contract, exchanging Digital Certificates or explicit partnerships. The existing trust based framework does not allow XML based information exchange between the organizations and universal portal vendors and/or their web spiders.

The current invention provides a framework to setup a trust-free and qualification-free framework to exchange structured unambiguous XML content between any organization and any XMAS-aware information-seeking visitor. However, it is contemplated that a trust-based exchange may follow between the host organization and a customer as a result of information initially exchanged in accordance with the present invention.

The information exchange protocol described in relation to the current invention, XMAS, also provides a framework where an organization can advertise its trusted services in a trust-free environment. An element of the information exchange could be the description of methods required to obtain services in a trusted framework. The Host server can integrate its trusted services into the trust-free framework offered by XMAS. Thus, in a fully implemented environment, XMAS allows seamless transition between Trusted and Trust-free environments.

Figure 1:
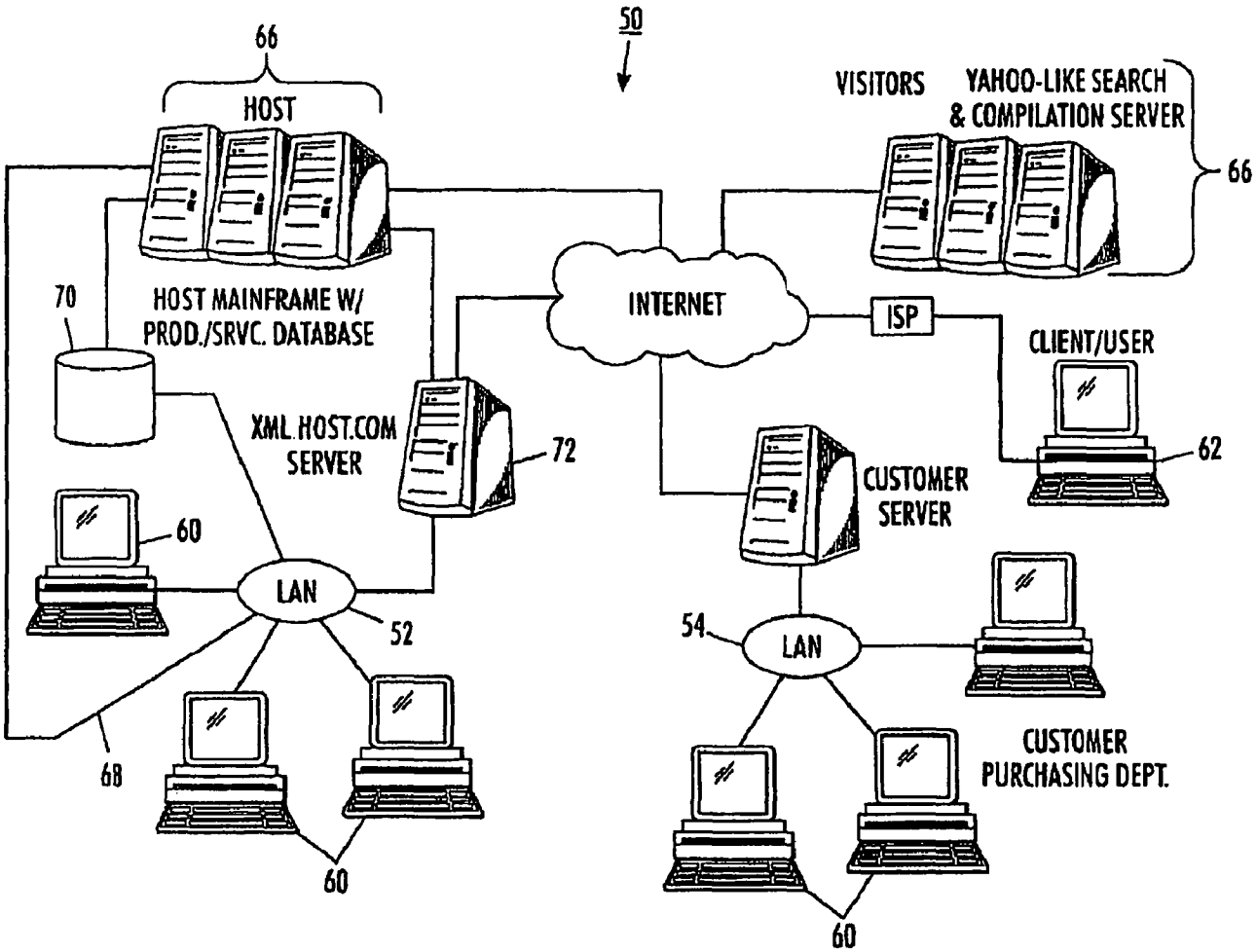
FIG. 1 is a diagram of a networked computing environment in which the present invention may be practiced.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

Referring to FIG. 1 there is illustrated a representative data processing network 50 in which the present invention may be practiced. The data processing network 50 includes a plurality of individual networks, including LANs 52 and 54, each of which includes a plurality of individual workstations 60 or single-user workstations 62. Alternatively, as will be appreciated by those skilled in the art, a LAN may comprise a plurality of intelligent workstations coupled to a host processor.

Figure 2:
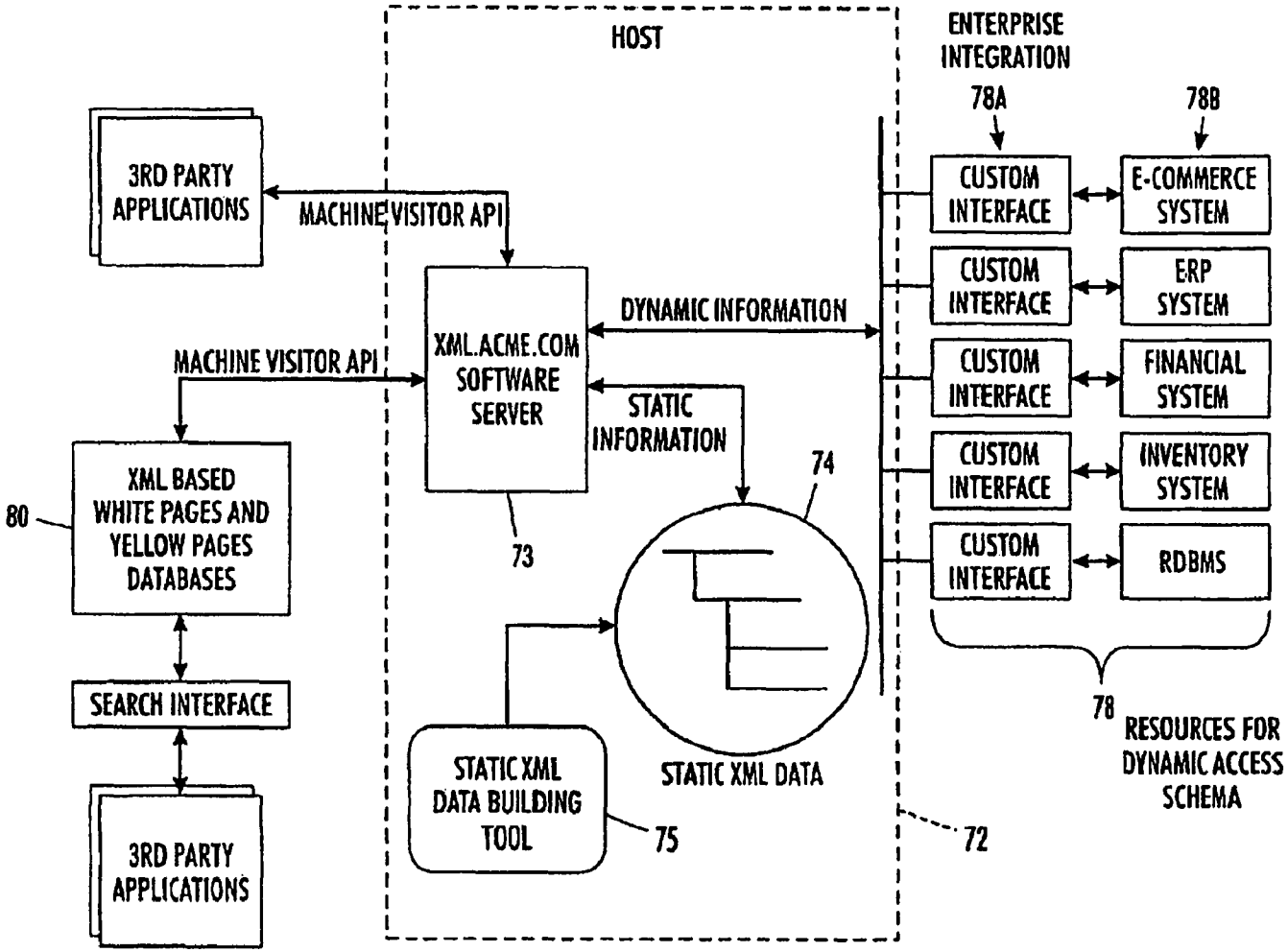
FIG. 2 is a block diagram of the software components employed in an embodiment of the invention depicted in FIG. 1.

The data processing network 50 of FIG. 2 may also include multiple mainframe computers 66 that may be coupled to the LAN 52 by means of a communications link 68. The mainframe computer 66 may be implemented utilizing an Enterprise Systems Architecture computer available from the International Business Machines Corporation. As will be appreciated by those skilled in the art, the term network includes both wired and wireless communication technologies, and the equipment associated therewith (e.g., personal computers, personal digital assistant (PDA) devices, cellular and digital telephones, etc.). It is further contemplated that the XML data stream described herein may be exchanged using a wireless communication protocol such as WAP.

The mainframe computer 66 may also be coupled to a storage device 70 that may also serve as remote storage for the LAN 52. Similarly, the LAN 52 may be coupled to a gateway server 72. The gateway server 72 is preferably an individual computer or intelligent workstation that serves to link the LAN 52 and host mainframe computer 66 to the other networked computers via an Internet connection (e.g., T1-line or equivalent).

It will be appreciated that the various components described in FIG. 1 may be co-located or separated by a significant geographic distance, and similarly, that the Host LAN 52 may be located a substantial distance from the Visitor LAN 52 and client/user workstation 62.

Software programming code that embodies an aspect of the present invention is typically accessed by a microprocessor (not shown) of the workstation 60 (or 62) from a long-term storage media of some type (e.g., hard drive or CD-ROM drive). In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type (e.g., Internet) to other computer systems for use by users of such other systems. The techniques and methods for embodying software programming code in memory, on physical media, and/or distributing software code via networks are well known and will not be further discussed herein.

The data stream resulting from use of the present invention may be stored on any of the various media types used by the long-term storage 70, or may be sent from a workstation 60 to another computer or workstation of the network illustrated in FIG. 1 over the communications channels, for storage by that other computer or workstation.

In a preferred embodiment, the present invention is implemented as a plurality of computer software programs operating in association with one another. These programs will be used where software applications retrieve data in response to a request, optionally perform some type of parsing and/or processing on the retrieved data, and format the data for internal storage and later use or display. (Processing of the data after retrieval, such as computing sums of retrieved numbers or formatting for purposes of display or retransmission, does not form a part of the present invention, and will not be discussed herein.) In a preferred embodiment, the programs are implemented in a stand-alone fashion, whereby one program implements only the host system features and functionality and another implements only the visitor features and functionality. Alternatively, the host and visitor features may be implemented as one or more modules (including subroutines and "objects" in object-oriented programming) that are incorporated along with other modules to form complete programs host- and/or visitor-based programs. The programs will typically execute on a computer functioning as a server, providing services in response to machine or user-generated requests. Alternatively, the connection may be to a corporate intranet (that is, a network owned or managed internally to the user's company) of which the user's computer is a component, where this corporate intranet provides services in a similar manner to the Internet. Use of the term "Internet" herein, when discussing processing associated with the user's request, includes processing that occurs in an intranet, unless otherwise stated.

While the preferred embodiment of the present invention contemplates that the data retrieval logic is implemented in a different program from that implementing the data formatting logic, the two different logic functions may be implemented in a single program without deviating from the scope of the present invention. In this case, the required functional isolation may be achieved by structuring the logic into separate modules, or groups of modules, per function.

Referring next to FIG. 2, there is depicted an XML Machine Access Schema that is preferably employed for Host Server 72 to enable visitor machines (running 3$^{rd}$ party applications) to passively discover or "pull" information from host 72. The purpose of the XML Machine Access Schema Server is to facilitate concurrent, scaleable, bidirectional interactions between the machine visitors and the host organization in a qualification- and trust-free manner. Such interactions can be accomplished on a user-initiated schedule, or in response to system events (i.e., scheduled events).

The XML Machine Access Schema Server 72 is accessible using a well-known destination URL for boot strapping (e.g., XML.HOST.COM). Server 72 provides a structured methodology for retrieving XML based structured content. The information it provides contains responses to the original query, as well as information on how the response itself can be used for further investigation. The interaction is meant to be close-ended, using a rule based syntax that is dictated by the server software 73.

The server provides conditional data interaction so that the information could be accessed using pre-programmed data retrieval. In one aspect, the information retrieved via the server is static data 74 that is periodically uploaded or refreshed, preferably using a setup or data-building tool 75. Data building tool 75 is suitable for receiving information, for example a catalog database, and processing the information so as to create an XML output suitable for access and sharing by the server software 73. The software tool preferably being suitable for building at least one repository of static data pertaining to the host organization's offerings.

The preferred embodiments of this manual tool are: (1) a Java application; or (2) Windows/Windows NT Application implemented in C/C++ or Visual Basic. The software tool enables the end user organizations that maintain and use the data (within the host organization) to define the data and services to be provided by the host server to the machine visitors. For data, the software tool provides features for interactively designing the static enterprise information intended for the machine visitors. The host software server (73) uses the database created by this tool, to enable the machine visitors to interactively traverse the information in hierarchical fashion. The setup tool shall preferably use any ODBC compliant database to store the static data. Optionally, the data is stored in text files. The data is always provided to the machine visitor in XML format, independent of the format used for the storage within the database 74.

For services, the setup tool automatically creates interface definitions necessary to support the enterprise's unique data requirements. These interface definitions are driven by the hierarchical relationships setup by the user as explained in the above paragraph. The interface definitions describe the response mechanism of the XMAS server to communicate to the machine visitors.

In another aspect, the server software 73 also provides the capability to access dynamic information of the host via the resources in dynamic access schema 78. In particular, such resources include interfaces 78A (custom interfaces to particular host systems) that not only provide an interface, but are also able to identify or control access to the information which the host organization selects for visitor access. In other words, the interface could be programmed to indicate available inventory for a product from the inventory system 78B,- and to indicate "0" units available but not to show what the backorder date is for the product.

The server software 73 provides ability to obtain the Hierarchical, Trust-Free, UI-Free representation of the enterprise information for anonymous visitors from dynamic enterprise information repositories. The dynamic interfaces enable the machine visitor to interface to the enterprise management systems and optionally, secure commerce servers, providing means to carry out meaningful commerce transactions automatically, if needed. As an example, a machine visitor could browse through the catalog of articles manufactured by an enterprise (static data), find an item, seek the information on how to procure that item, and use a dynamic interface to the organization's secure E-commerce server or EDI server, to initiate a commercial transaction.

The Machine Access Schema Server is preferably:

1) An application framework, not just an application, where application frameworks are end-user customizable applications that allow the system to be tailored to the needs and existing systems of a particular host organization;
2) Object Oriented;
3) The Machine Access Schema Server Architecture is based on Strategy Design Pattern, as found, for example, in "Design Patterns: Elements of Reusable Object-Oriented Software," by Erich Gamma et al., including pages 315-323 which are hereby incorporated by reference for their teachings;
4) An abstract of business rules and requirements, thus enhancing generic usage; and
5) An application wherein functionality can be added without re-compiling the existing application.

The server 72 preferably uses the dynamic data interfaces to provide the information in real-time. The dynamic interfaces are designed to function as user extendable implementations of the same interfaces used for the static interfaces. Different Data Repositories require customized interface implementations. For example, the interface required to integrate the data from an Oracle RDBMS would be much different from the interface implementation of SAP based ERP system.

The dynamic interfaces 78A are preferably implemented as Java interface implementation classes. The dynamic interfaces can coexist with the static interfaces such that they can be implemented gradually. In one embodiment, the interfaces 78A may be implemented as "wizards" or as APIs buils around rules-based engines. It is contemplated that a commercially available rules-based engine or an independently developed engine may be employed, and the API used to "customize" the interface to the host organizations systems 78B.

The systems 78B for which dynamic interfaces are presently contemplated include:

1) RDBMS system—to get any data in relational format;
2) Inventory control Systems—to get the availability, stock levels and reordering information;
3) Financial systems—to get the prices, discount and rate plans;
4) Enterprise Resource Planning systems—to take a comprehensive view of a very complex operation; and
5) E-Commerce systems—to order items automatically.

Having described the basic components of the schema, the following architectural features of the schema will be addressed. As is indicated by server software 73, all machine access requests by the visiting machines are preferably handled by a single object. Visitors accessing the host 72 via the Machine Visitor API identify their requests using a unique request identifier, called "Interface". For example, URL is an interface request identifier. It is anticipated that initial contacts or requests to the host will be for static information as contained in the static data repository 74, however, both static and dynamic information may be shared as described below.

The server can communicate with the machine visitors using one or more of multiple methods—HTTP and Java Message Service (JMS). Using the ubiquitous HTTP protocol, any machine visitor can access the server 72, by embedding the XML based initial and the subsequent requests in the HTML Get messages. The server responds to the HTTP requests in XML-based ASCII text format. Using the JMS protocol, the server can provide the same responses in a more scaleable and reliable fashion. In addition to the simple request/response type communication, the JMS based architecture provides features such as persistence, verification and transaction support.

Alternatively, the information exchange may occur in an asynchronous or "batched" mode, wherein the data exchange is accomplished using FTP or SMTP protocols. Similarly, JMS can be operated in an asynchronous mode using the subscribe-publish model, requiring another MOM layer above the bootstrap URL (xml.acme.com).

Figure 3:
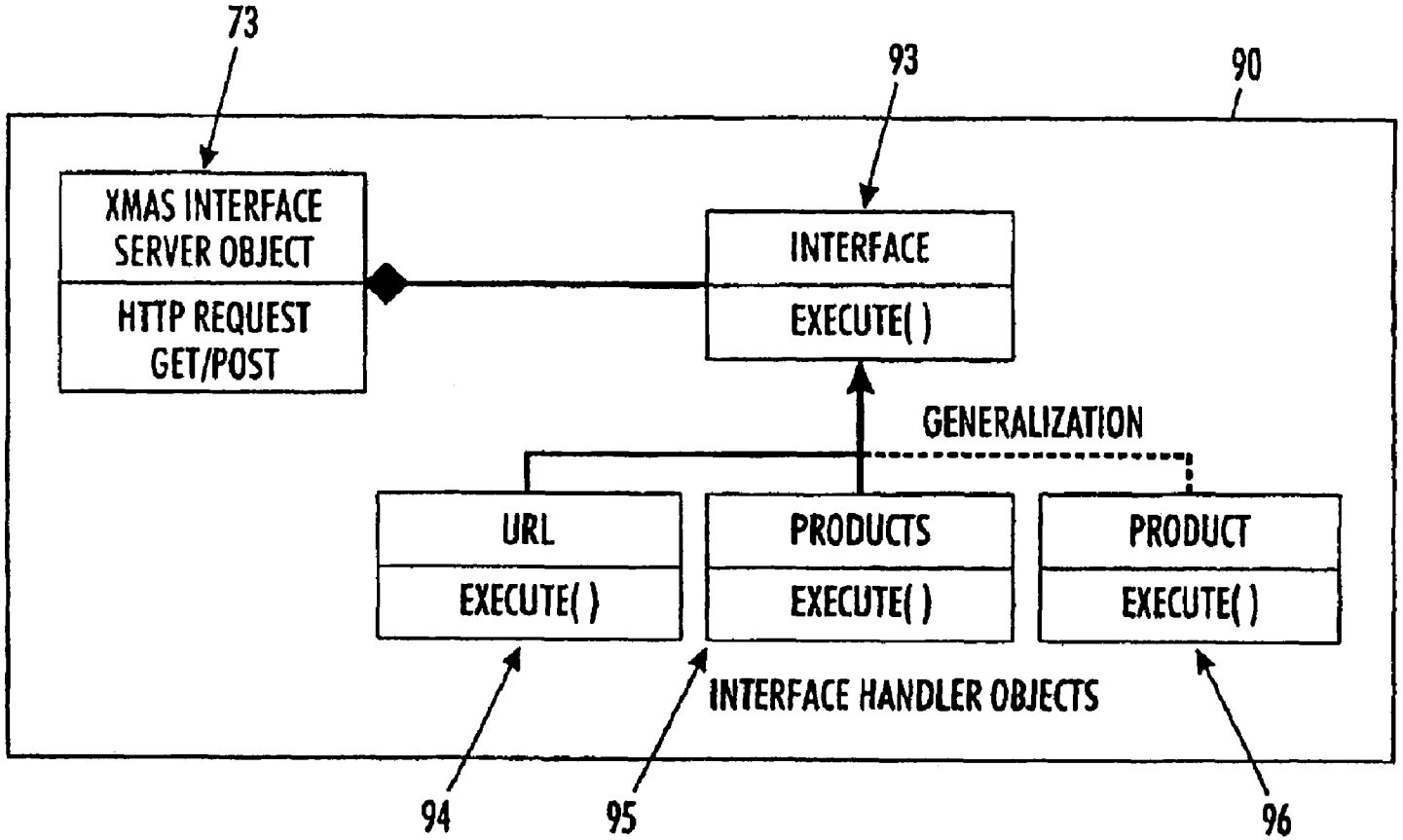
FIG. 3 is a diagram depicting the architecture of the host software of FIG. 2.

In the preferred embodiment, each interface request is handled by a separate "interface handler object". That means if the Interface Server intends to service three requests—URL, Products and Product, there will be three classes by the same names. Referring also to FIG. 3, where there is depicted a class diagram 90 for the example; the structure of the data will be described. The objects within the class 90 include the server object 73, which interacts with the interface object 93. Via object 93, the server is able to access URL object 94, Products object 95 and/or Product object 96. The information shared via access to each of these objects is further described with respect to the dialog below.

In the preferred embodiment, each interface handler class is uniquely identified by the name of the interface request it is meant to service. All interface handler objects are descendents of a common or parent class, "Interface". Hence, all the three example classes (94, 95 & 96) are extended classes of the parent class, "Interface" (93). Preferably, the Interface Server 73 instantiates an Interface handler through the parent class name and the subclass name, applying the principle of polymorphism. The Interface server passes parameters to the interface handler through a generic mechanism such as a hash table.

Compared to other mechanisms such as passing the parameters directly and using the vectors, the Java hash tables facilitate storing of key/value pairs and can grow dynamically. A hash table allows any number of parameters of any type to be passed between the requestor and its handler, without changing the method signature of either caller or the callee.

Figure 4:
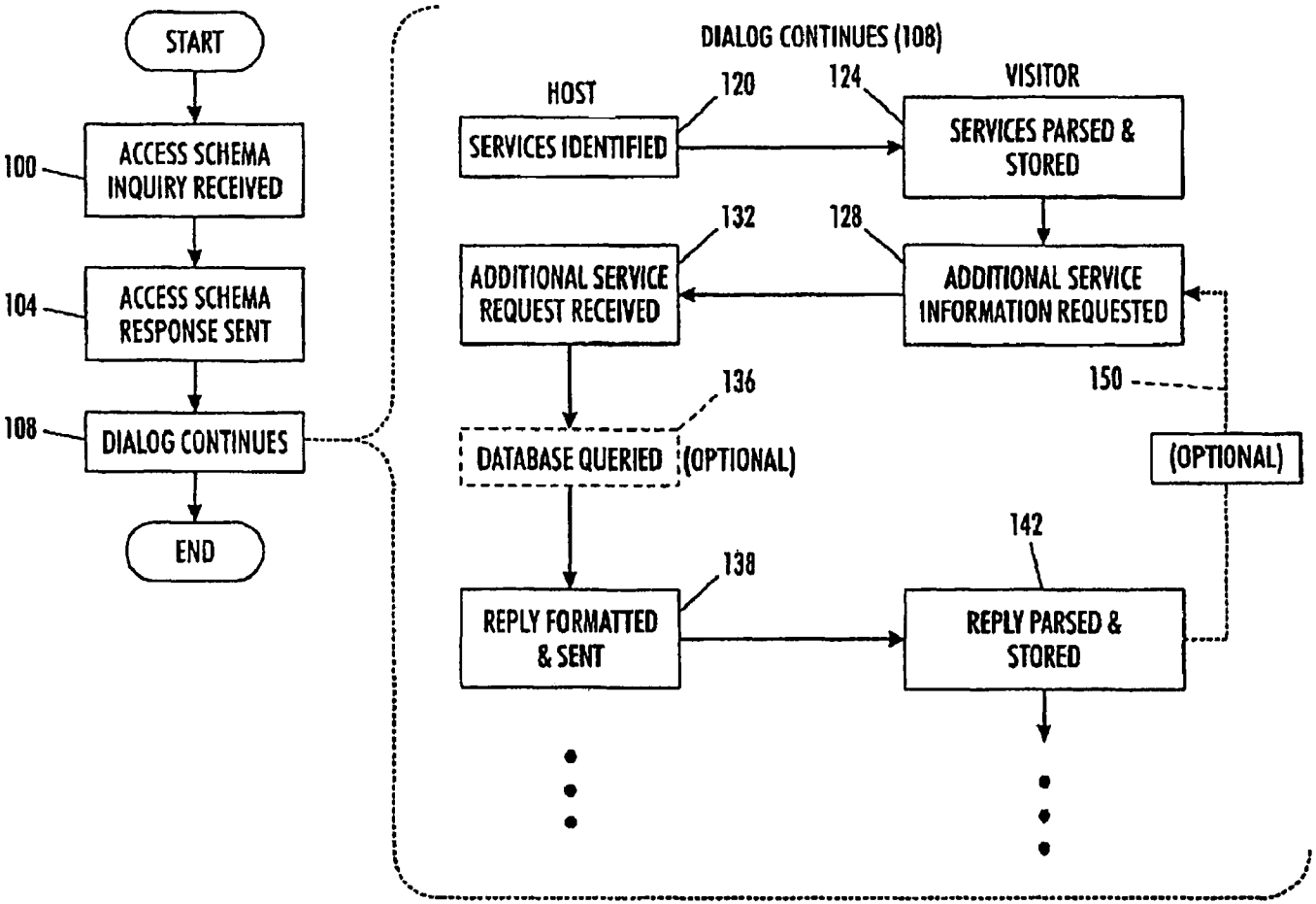
FIG. 4 is a flow diagram setting forth the general communication protocol employed by an embodiment of the present invention.

In order to further describe an embodiment of the present invention, the following example of an interaction is proposed, based upon a general communication protocol as depicted in FIG. 4. In particular, the communication process occurs in a series of back-and-forth communications between a host machine and one or a plurality of visitor machines. The general process steps are depicted along the left side of FIG. 4, starting with step 100. To initiate a communication session, a visitor machine sends a message requesting an access schema from the host, step 100. The visitor may have predefined knowledge of the host, or may identify the host through a search engine or a trial search at a preferred URL such as xml.acme.com. Once the request is received at step 100, the host machine responds to the request with its access schema, step 104. As will be described in further detail below, the access schema for a particular host is host-specific and it is the transmission of the schema that enables the visitor machine to understand the hierarchical arrangement of the host machine information. After sending the access schema, the host machine takes no further action unless the visitor replies with a further inquiry. At that point, the machines engage in a dialog as represented generally by step 108 and as depicted in further detail on the right side of FIG. 4.

A dialog 108 includes, for example, a set of services being identified by the host (120), parsing of the services reply (124), and formulation of an additional services request by the visitor (128). The additional services request, upon being received by the host (132) initiates an optional data gathering procedure whereby a database may be queried to obtain information (136). It will be appreciated that the data gathering process may be real-time or batched, depending upon the desired frequency of updating information to be "published" to visitors. If the information is intended to be visitor-specific, data gathering would likely be dynamic (in response to a visitor request).

Once the information necessary for the host to respond is available, the reply is formatted and sent from the host (138) and subsequently received and parsed again by the visitor. As indicated by optional process flow line 150, the various procedures of the dialog continues step 108 may be repeated as the visitor obtains further information about one or more hierarchical levels of information residing with the host.

To further describe the communication protocol using XML and the machine-to-machine communication steps, the following example of a fictitious company, Acme Inc. will be used. As is the case with world-wide web interfaces, it is often known to identify a website using the company name. In a similar fashion, the machine-to-machine communication interface is preferably a derivative of the company name, such as: xml.acme.com, where xml.acme.com provides a comprehensive overview of its services, offerings and other details to any machine visitor. The machine interface server at xml.acme.com (e.g., server 72 in FIG. 1) will provide this information in a self-validating, stateless, and structured manner using XML syntax. Self-validation and structure are accomplished as a function of the extensible markup language, where the document type definition (DTD) provides the structure and serves as the basis for self-validation. The system is stateless as the host preferably returns consistent information each time a visitor machine sends the same request or query. The information is referred to as an access schema. In other words, when any machine or software-based system accesses the xml.acme.com URL, the host machine interface server at server responds back with Acme's access schema information.

A typical access schema message at an upper level (e.g., Level 1) might look like the following in XML:

```
<interface name-discovery>
  <Attribute Name=Services Mode=out>
    <Element>Organization</Element>
    <Element>URL</Element>
    <Element>Address</Element>
    <Element>ProductList</Element>
  <Element>ServiceList</Element>
  </Attribute>
</interface>
```

Figure 5:
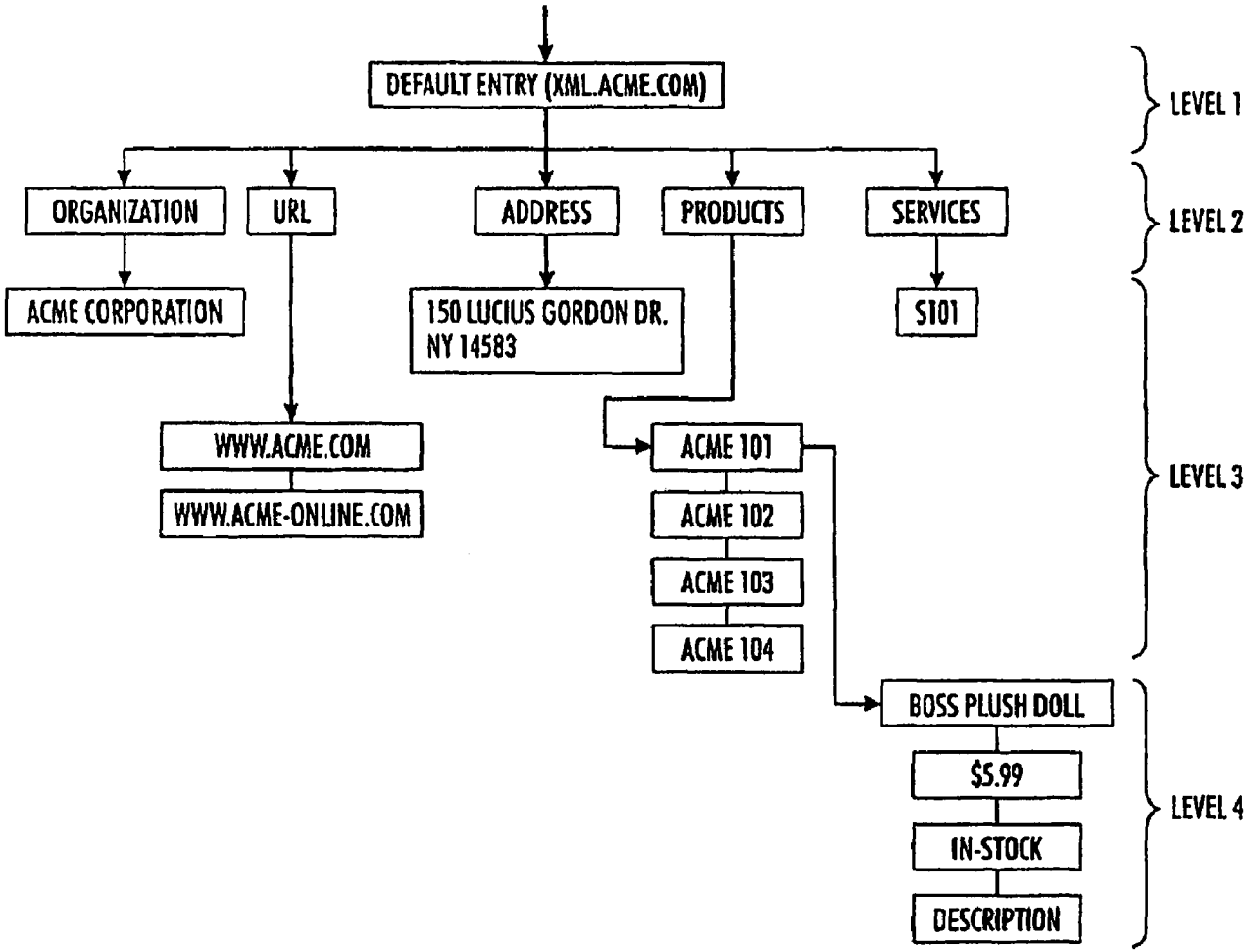
FIG. 5 is a hierarchical structure diagram illustrating various hierarchical levels in an exemplary embodiment of a host machine.

Referring to FIG. 5, the above message is also depicted at Level 1 therein and preferably identifies itself as an access schema message and advertises what other services/data the host can offer. The services (Level 2) are described in an attribute or element called "Services". The "Services" attribute has several elements itself, including Organization, URL, Address, ProductList, Product, ServiceList, and Service etc. Each of these elements indicates a unique product or service the machine interface can offer. As noted above, the Level 1 and Level 2 objects are generally understood to represent static data, whereas at least some information in Level 3, and particularly in Level 4 is dynamic information that may be obtained, for example, from the host organization's E-commerce and/or Inventory systems.

Dialogue

Based on the information parsed or gleaned from the access schema message, the visitor machine can continue the dialogue with the host machine xml.acme.com on each service. For example, if the visitor is accessing xml.acme.com for the very first time, it may begin by adding a record entry for Acme to its locator database using the Organization, URL and Address services.

The machine visitor may "talk back" to xml.acme.com for its Organization service by, for example, sending the following message:

```
<interface name=Organization>
</interface>
```

Subsequently, the Xml.acme.com host machine would respond to the visitor query with a message that might look like:

```
<interface name =Organization>
  <Attribute Name=RegisteredName Mode=Out>
    <Element>Acme Corporation </Element>
  </Attribute>
</interface>
```

As can be seen by inspection of FIG. 5, the information provided in the ensuing replies sent by the host machine is lower-level hierarchical information such as that contained in Level 3 of the Organizational service.

Figure 6:
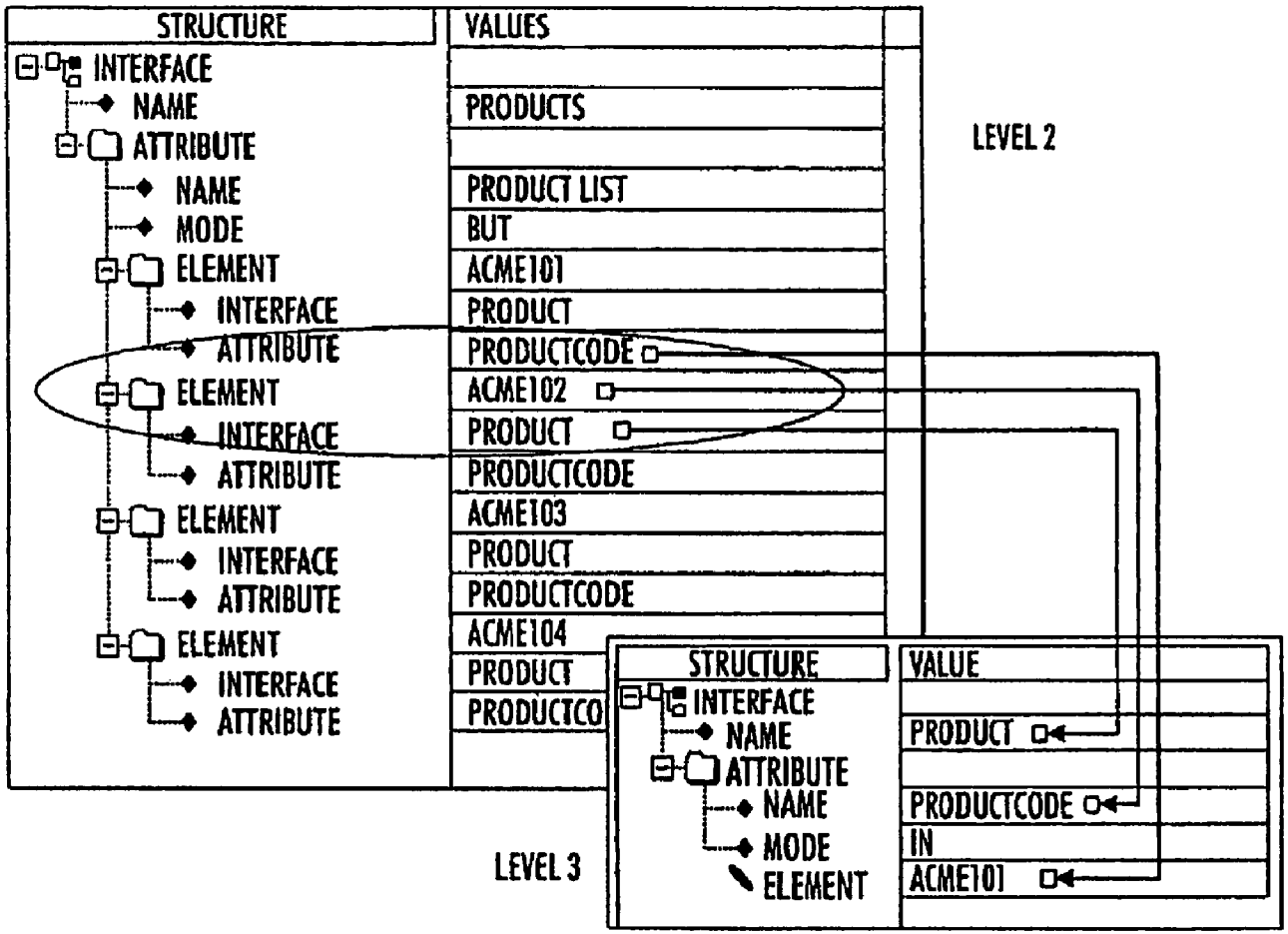
FIGS. 6-7 are further examples of the hierarchical storage of information obtainable from the host machine as depicted in FIG. 5.
Figure 7:
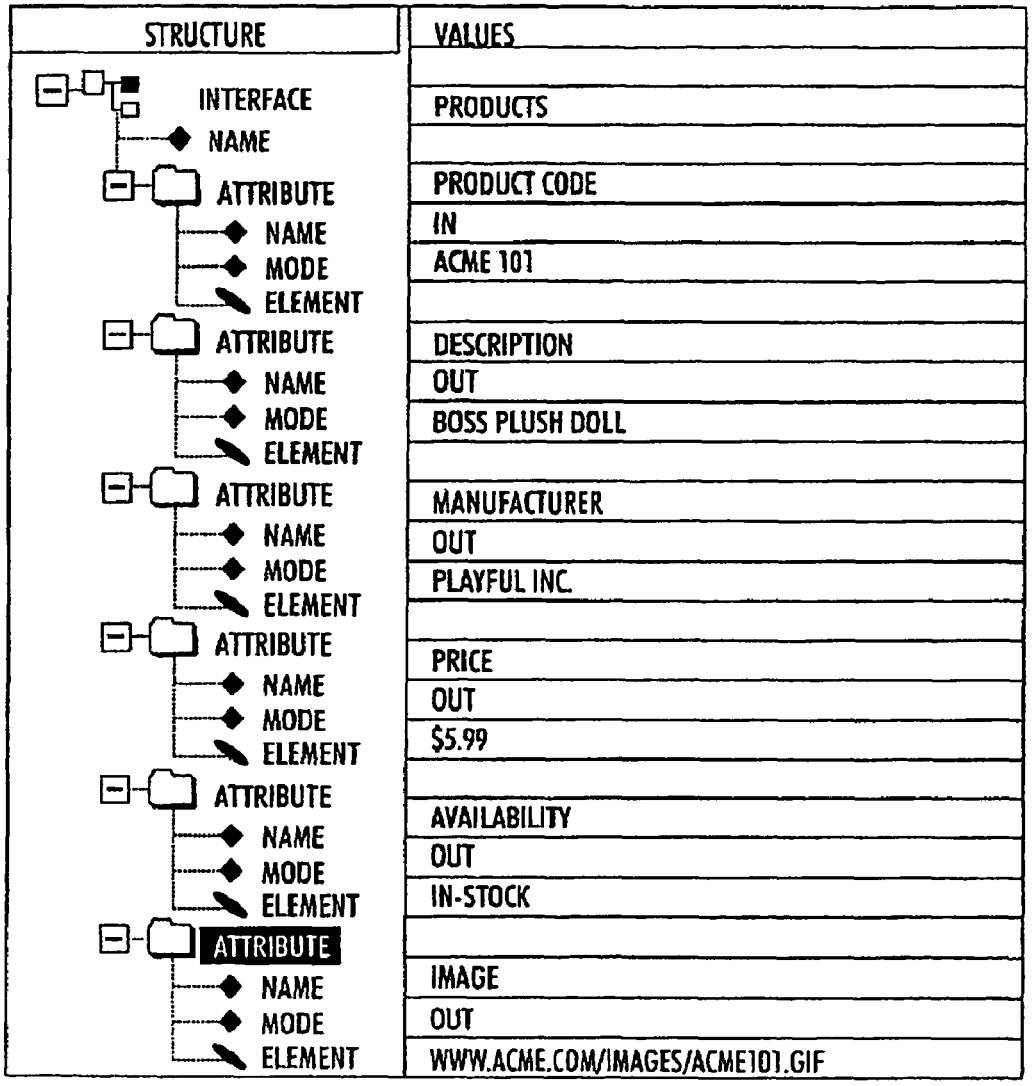

The following exchanges between a host and visitor are intended as exemplary exchanges that depict the transfer of information as represented in FIG. 5. In particular, FIG. 5 depicts a possible hierarchy of four levels, each providing additional information for the services in the access schema. As depicted in FIGS. 6 and 7, it is possible for a back-and-forth communication of access schema information to enable the visitor machine to retrieve information from the hierarchical structure of a host machine, or a database to which it has access (e.g., product database).

TABLE A

| Visitor | Host |
|---|---|
| <interface name=URL><br></Interface> | <interface name=URL><br><Attribute Name="Internet Address"<br>Mode=out><br><Element>www.acme.com<br></Element><br></Attribute><br><Attribute Name="Alternate Internet<br>Address" Mode=out><br><Element>www.acme-online.com><br></Attribute><br></interface> |

In the example above, the visitor machine asks for the URL of the host using a Service Discovery message such as depicted above. The visitor came to know of the service called 'URL' from the host's access schema message. The host xml.acme.com replies with what other services it can offer. They are described in an attribute called "Services". The "Services" attribute has several elements, including: Organization, URL, Address, ProductList, Product, ServiceList, and Service. Each of these elements indicates a unique service that the host machine interface can offer.

TABLE B

| | |
|---|---|
| <interface name=ProductList><br></Interface> | <interface name=Products><br><Attribute Name="Product List"<br>Mode=out><br><Element Interface=Product Attribute =<br>ProductCode> ACME101 </Element><br><Element Interface=Product Attribute =<br>ProductCode> ACME102 </Element> |

TABLE B-continued

```
<Element Interface=Product Attribute =
ProductCode> ACME103 </Element>
<Element Interface=Product Attribute =
ProductCode> ACME104 </Element>
</Attribute>
</interface>
```

In the example of Table B, the visitor machine requests a service on the interface called 'ProductList'. Again, the visitor knew about the service called 'ProductList' from the host machine's access schema. The host machine xml.acme.com replies to the visitor's service request by providing a list of elements as before. However, there is an important difference this time. In addition to the output (e.g. ACME101), the host added two Level 3 properties to each element. The first property is called Interface (value is Product) and the next property is called Attribute (value is ProductCode). By providing these two properties, the host system is advertising or promoting information about another service in which the corresponding elements can be used. The two properties indicate that there is a service called Product, to which the element's value (e.g. Acme101) can be passed as an input attribute with the name ProductCode.

The example of Table C illustrates the manner in which the visitor machine uses this information and queries the host for information on product Acme101. The host system responds with the information about the product code Acme101.

TABLE C

```
<Interface Name-Product>
<attribute
Name=ProductCode
Mode=In>
<Element>ACME101
</Element>
</Attribute>
```

```
<interface name=Product>
<attribute Name=ProductCode
Mode=in>
<Element> Acme 101 </Element>
</Attribute>
<Attribute Name=Description
Mode=out>
<Element>Dilbert Plush Doll
</Element>
<Attribute>
<Attribute Name=Manufacturer
Mode=out>
<Element>Playful Inc. </Element>
<Attribute>
<Attribute Name=Price Mode=out>
<Element>5.99
</Element>
</Attribute>
<Attribute Name=Availability
Mode=out>
<Element>In-Stock</Element>
</Attribute>
<Attribute Name=Image Mode=out>
<Element>www.acme.com/images/acme101.
gif
</Element>
</Attribute>
<Attribute Name=Review Mode=out>
<Element>
On days when your boss is driving you
particularly nuts, try easing your anguish
with the Boss Doll, a stuffed replica of
your boss including his/her picture laminated
on the face.
</Element>
</Attribute>
```

The above examples illustrate how a machine based visitor can access xml.acme.com and build an entire database on its contents (e.g., FIGS. 6 and 7) recursively and automatically. The dialogue between the visitor and the host is based on a well-formed and structured interchange of data. The information gained from this dialogue by a machine visitor can be used to build an application database based upon relational techniques. In a relational database, the data is stored in a set of tables, normalized, and indexed to facilitate key-based retrieval using SQL syntax. The relational data tables may store the information to be accessed using generic query parameters such as, Organization, Product, Service, Price, Zip Code or Country.

Since each organization is expected to have some universally generic information (examples: URL, Address, contact numbers) and some specific information (Example: goods and services related information), the data model should be flexible enough to allow seamless and universal data handling and retrieval.

The application would preferably use the relational data to provide information accurately and with high confidence rather than depending upon the error-prone, fuzzy, free-text-matching results. Additionally, the application may provide features such as comparative price shopping, neighborhood shopping, and query-by-example format search features.

Since the data is stored in relational attributes, the application may be used to provide data warehousing features on a massive scale to satisfy the needs of statistical and analysis communities. The application should have features to enable automatic building and rebuilding of the relational databases using an XML spider based on the machine visitor API. As is known in the Internet community, a spider is a program that automatically seeks and accesses new internet hosts at periodic intervals, and uses that information to build searchable databases.

Host Side Strategy

To provide an xml.acme.com interface to an existing website such as www.acme.com, it is preferable to provide a Java-based solution that can be freely downloaded and implemented with little or zero-programming effort. It will be appreciated by those skilled in the design of Internet-based systems that other programming techniques (including Microsoft Active Server Pages), can be used to provide the same functionality as a Java-based system described herein.

The host side Java solution consists of an XML aware Java servlet, and a Java-based graphical user interface (GUI) configuration program that facilitates the XML machine access schema and Service Definition setup. The configuration program preferably provides for the definition of a data source and a query to implement each service advertised in the service definition. The host side XML servlet and the related classes have the ability to support the access schema and each advertised Service based on the configuration process.

Visitor Side Strategy

Once content is available, the Portal Companies (e.g. Yahoo, Alta Vista etc.) will preferably develop the means and ways to automatically access these sites, build text search engines, warehouse the data and provide vertical services. So long as corporations are enabled to easily to provide an XML based interface meant for machines, Portal Vendors will immediately build software to exploit the machine interface.

Some interesting applications can be built as direct consequences of implementing the XML based machine-to-machine interface based on XMAS. These include Universal Web "White" and "Yellow" Pages such as depicted in FIG. 2, item 80 that provide a highly accurate listing of goods and services, XML based Web Search Engines, and XMAS based web spiders to retrieve and "catalog" the information.

For example, the explosive growth of the world-wide web makes the already labor intensive process of tracking the suppliers of goods and services, an impossible task. A web 'spider' process that is XML-aware working on the sites that are XML capable will help resolve this problem.

1) Using the bootstrap notion of the XML equivalent of a website, the XML spider can periodically query the hierarchical data structure of the host server population and setup directory applications (e.g., XML based White Pages and Yellow Pages) for goods and services.

2) A directory of the destination URLs for XML based machine-to-machine interface.

3) Outsourcing the XML based M2M interface servers.

4) Customizable interface packages for the standard commercial RDBMS, ERP, Financial, Inventory and e-Commerce applications.

As further depicted in FIG. 2, the example of a Search Interface 82, should provide features such as free-text search, parametric search, and programmatic search. The search features would preferably be available for human interaction as well as machine interaction. The search interface for machines should be implemented using the same Machine Visitor API described herein. The application acts as a host when a machine visitor accesses it to avail its search features.

In one embodiment, the search interface would have hierarchical menus of unlimited depth, where the hierarchical menu consists of a set of selection lists, where selection of an item in a list dynamically updates the choices of selection in the next selection list. The hierarchy starts at the root of the information tree, and each selection list in the menu provides entry into the next level of the tree hierarchy. In the embodiment contemplated, the application would support dynamic re-configuration of the information hierarchy. For example, a geography-based tree will have "World" at the root, "Countries" at the next level, and "Cities" at the next level and so on. The same information could be rendered by the application to provide an alternative hierarchical view, for example, a view whose levels are arranged based on product categories such as "Vehicles," "types of vehicles," "brands" and "colors".

Further examples of applications that might be implemented to interface and employ the information shared using the present invention include:

1) a comparative price shopping interface, where comparative price data is obtained using the present invention from a number of vendors of equivalent goods/services;
2) a neighborhood shopping interface where the results of a product search are limited to a specific location identifier such as Zip Code; and
3) a query-by-example search interface where the user can form queries (e.g., http://aol.webopedia.com/TERM/q/query.html) from a blank record (e.g., http://aol.webopedia.com/TERM/q/record.html) with a space for each field (e.g. http://aol.webopedia.com/TERM/q/field.html). The user can enter conditions for each field to be included in the query.

In recapitulation, the present invention is a method and apparatus for machine-to-machine communication protocol and system having a predefined destination (universal resource locator (URL)) for bootstrapping the communication process, and a structured content protocol using XML. The system is also closed-ended, using a rule-based syntax with conditional data interaction. In a preferred operation, the system includes GUI-based design and programming tools that enable the set up of host and/or visitor machines in accordance with the protocol.

It is, therefore, apparent that there has been provided, in accordance with the present invention, a method and apparatus for the automated exchange of information, and more particularly the use of a hierarchical protocol based upon an extensible markup language (XML) in order to enable machine-to-machine communication of data related to the availability of goods, services and information. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

[1. A system for facilitating structured content transfer between a host server and an information-seeking visitor machine, including:

a host server having access to data pertaining to vendor offerings;

a computer-based visitor machine for establishing a dialog with the host server, and a network interconnecting the host server and visitor machine to enable for the exchange of data therebetween;

wherein the visitor machine initiates a dialog with the host machine for the purpose of determining the goods and services offered therein.]

[2. The system of claim 1, wherein the host server is identified using a universal domain identifier.]

[3. The system of claim 1, wherein the data is stored in a hierarchical format.]

[4. The system of claim 1, wherein the data is free of any user-interface formatting information.]

[5. The system of claim 1, wherein the system is trust-free so as not to require that the visitor machine provide any authentication or authorization information to the host server.]

[6. The system of claim 1, wherein the system further includes a software tool, associated with the host server, for building at least one repository of static data pertaining to vendor offerings.]

[7. The system of claim 1, wherein the system includes at least one repository of dynamic data pertaining to vendor offerings, and where the system further includes an interface to the at least one repository of dynamic data.]

[8. The system of claim 1, wherein the system further includes an interface that is a machine visitor interface.]

[9. The system of claim 1, further including:

an application using the information gained from a host organization; and an application database created from information gained by the application, wherein the application database comprises relational data tables that can be accessed to locate goods and services using generic query parameters.]

[10. The system of claim 9, wherein the generic query parameters are selected from the group consisting of:

Organization;
Product;
Service;
Price;
Zip Code; and
Country.]

[11. The system of claim 9, wherein the application provides a comparative price shopping interface.]

[12. The system of claim 9, wherein the application provides a neighborhood shopping interface.]

[13. The system of claim 9, wherein the application provides a query-by-example search interface.]

[14. The system of claim 9, wherein the application is capable of building and rebuilding the database using a spider based upon a machine visitor API.]

[15. The system of claim 9, further including a search interface interfacing to the host server via a machine visitor API.]

[16. The system of claim 15, wherein the search interface provides a free-text search, a parametric search, and a programmatic search.]

[17. The system of claim 15, wherein the search interface includes a plurality of hierarchical menus.]

[18. The system of claim 15, wherein the information is stored in the database in accordance with a particular hierarchy and where the application supports dynamic reconfiguration of the hierarchy in which the information is stored.]

[19. A method for machine-to-machine communication to facilitate electronic information exchange, comprising the steps of:

receiving an access schema inquiry from a visitor machine; and in response to the request from the visitor machine, sending from a host machine to the visitor machine, an access schema description for at least an upper level of said schema, wherein the access schema description advertises services offered by the host.]

[20. The method of claim 19, further comprising the step of conducting a service dialog between the host machine and the visitor machine, wherein a host response is sent in reply to a visitor request, and where the visitor request is a function of information received by the visitor machine in the access schema description.]

[21. The method of claim 20, wherein the host response is sent in reply to a visitor request, and where the visitor request is a function of information received by the visitor machine as a host response.]

[22. The method of claim 19, further comprising the step of searching for a host machine at a domain name that is a predefined derivative of a preexisting upper-level domain address.]

*23. A system, comprising:*

*a computer-based host server;*

*a computer-based machine visitor configured to establish, in response to a system event, a machine-initiated dialog with the host server; and*

*a network interconnecting the host server and machine visitor to enable the exchange of data pertaining at least in part to vendor offerings therebetween;*

*wherein the machine visitor is configured to initiate the automated machine-to-machine dialog with the host server in order to exchange a schema that is specified according to an extensible structured content protocol therebetween.*

*24. A computer-readable memory medium having stored thereon computer-executable program instructions that, in response to execution by a machine visitor, cause the machine visitor to:*

*send, in response to a system event, a request to a computer-based host machine for the initiation of machine-to-machine communication with the host machine, wherein the machine visitor is anonymous relative to the host machine;*

*subsequently exchange information with the host machine, wherein the information exchanged as part of the machine-to-machine communication relates at least in part to vendor offerings and includes a descriptor that is indicative of data available at a top-most level of a hierarchy or information stored on the host machine, wherein the descriptor is specified at least in part according to an extensible structured content protocol.*

*25. A system, comprising:*

*a machine visitor, comprising:*

*a processor;*

*memory coupled to the processor; and*

*a network interface coupled to the processor;*

*wherein the machine visitor is configured to send, in response to a system event, an automated request for machine-to-machine communication by accessing a machine-accessible interface of a host machine via a uniform resource locator identifying a web location associated with the host machine, and further configured to automatically exchange information that relates at least in part to vendor offerings and includes an access schema with the host machine according to an extensible structured content protocol, wherein the machine visitor is not pre-qualified relative to the host machine.*

*26. The system of claim 25, wherein the machine visitor comprises a wireless interface usable to access the World Wide Web.*

*27. The system of claim 25, wherein the machine visitor is configured to access the host machine using a web spider.*

*28. A method, comprising:*

*receiving, at a machine-accessible web interface of a host machine, a request for machine-to-machine communication from a web spider, wherein the request is not user initiated, and wherein the web spider is not pre-qualified relative to the host machine;*

*the host machine providing information to the web spider as part of the machine-to-machine communication, wherein the provided information pertains at least in part to vendor offerings and includes an access schema that is specified at least in part according to an extensible structured content protocol.*

* * * * *

UNITED STATES PATENT AND TRADEMARK OFFICE

CERTIFICATE OF CORRECTION

PATENT NO. : RE44,110 E
APPLICATION NO. : 11/489751
DATED : March 26, 2013
INVENTOR(S) : Venigalla It is certified that error appears in the above-identified patent and that said Letters Patent is hereby corrected as shown below:

On Title Page 2, in Item (56), under "OTHER PUBLICATIONS", in Column 2, Line 4, delete "no date." and insert -- Mar. 27, 2008. --, therefor.

In the Specification
In Column 2, Lines 6-7, delete "NorthernLights.com®" and insert -- NorthernLights.com®. --, therefor.

In Column 4, Line 23, delete "DESCRIPTION" and insert -- DETAILED DESCRIPTION --, therefor.

In Column 5, Line 65, delete "bidirectional" and insert -- bi-directional --, therefor.

In Column 6, Line 54, delete "system 78B,-" and insert -- system 78B, --, therefor.

In Column 7, Line 33, delete "buils" and insert -- builds --, therefor.

In Column 9, Line 41, delete "<interface name-discovery>" and insert -- <interface name=discovery> --, therefor.

In Column 10, in Table B, insert Header Row --

| Visitor | Host |
|---|---|

--.

In Column 11, in Table C, Line 1, delete "

| <Interface Name-Product> | <interface name=Product> |
|---|---|

" and insert --

| Visitor | Host |
|---|---|
| <Interface Name=Product> | <interface name=Product> |

--, therefor.

Signed and Sealed this
Twenty-ninth Day of October, 2013

Teresa Stanek Rea
*Deputy Director of the United States Patent and Trademark Office*